INVENTOR.
ARNOLD U. HUGGENBERGER
BY Walter S. Heston
ATTORNEY

Fig. 7.

United States Patent Office 3,006,185
Patented Oct. 31, 1961

3,006,185
INSTRUMENT FOR MEASURING MECHANICAL QUANTITIES ACCORDING TO THE CARRIER-FREQUENCY METHOD
Arnold U. Huggenberger, Ackersteinstrasse 119, Zurich 10/49, Switzerland
Filed July 31, 1958, Ser. No. 752,361
Claims priority, application Germany Oct. 29, 1957
15 Claims. (Cl. 73—88.5)

The invention relates to an instrument for measuring mechanical quantities according to the carrier frequency-method, especially of forces, elongations, tensions and movements of machine parts. The measured values are received by elongation-measuring strips such as e.g. strain gauges or by inductive transmitters which constitute parts of a Wheatstone bridge. The bridge is balanced by strain-gauge strips mounted on deformable springs. The carrier-frequency voltage is generated by a motor generator which may be designed to feed several amplifiers.

Conventionally in such measuring devices amplifier tubes are used which are not suited for measuring especially in motor vehicles and aircraft on account of the dependence of their current supply on the power network and their sensitivity to shocks as well as on account of their large dimensions and output power.

The invention aims to avoid the drawbacks of the conventional instruments. An instrument according to the invention constitutes a combination of a plurality of individual parts or part units, such as a carrier-frequency-measuring amplifier with miniature amplifier elements, a motor-generator independent from the network for low carrier frequencies of e.g. 1000 to 2000 cycles, and a testing apparatus of dimensions approximating those of the amplifier housing.

Such an instrument is particularly well suited for series-measuring in vehicles and airplanes and excels by its handiness, simplicity of operation and current supply, constant rate of amplification and simplicity of calibration.

Another object of the invention is the provision of a measuring instrument with very small dimensions and simple current supply by a flashlight battery owing to the use of an amplifier with miniature amplifier elements, especially transistors.

Another object of the invention is the provision of a testing apparatus having a constant rate of amplification and means such as a multiple plug to connect such apparatus to the amplifier, whereby the measuring system is ready to be operated in a very short space of time inasmuch as neither network disturbances nor e.g. high-frequency voltages can influence the system.

The invention also aims to provide an instrument adapted, on account of the low carrier frequency of e.g. 1500 cycles, to register, with amplitude fidelity and in phase, static or dynamic phenomena within the range occurring in vehicles, i.e. up to 300 cycles, for which purpose strain-gauge strips or induction-coil senders may be used as measurement transmitters.

The advantage offered by the low carrier frequency is particularly apparent in the simple manner of the balancing of the input bridge with the aid of the bridge elements located in the amplifier housing wherein capacitative influences of the cable length are negligible.

The balancing of the input bridge may be accomplished in a manner known per se by strain-gauge strips arranged on a leaf spring and deformable by a screw-threaded spindle. There is no necessity for balancing the resistance-gauging strips. An ancillary device may be used in the measuring circuit for capacitatively balancing inductive senders.

The amplifier operating with transistors has a low input resistance and, therefore, excels by a good adaptability to the measurement transmitters and by suitable design of the output bridge for the measuring loops. The modulation of the amplifier can be varied by changing the battery voltage. This is impossible with tube amplifiers.

The invention further aims to provide a testing apparatus for checking and calibrating the amplifier whereby, when the testing apparatus is coupled with the amplifier by means of a multiple plug, a stepwise graduation in per-mill elongation can be obtained by placing weights upon a bending element secured to the instrument or by an electrical detuning with toleranced resistors.

The operating voltages of the current supply may be controlled by a stepped switch at the indicating device.

Further objects and features of the invention will be apparent from the following description and accompanying drawing illustrating an embodiment thereof by way of example.

In the drawing:
FIG. 2 is a circuit diagram of an ancillary device for measuring with inductive transmitters;
FIG. 3 is a circuit diagram of an output bridge as another ancillary device for the measuring with induction transmitters;
FIG. 8 diagrammatically illustrates a sensitivity regulator with a battery switch.

Figure 1:
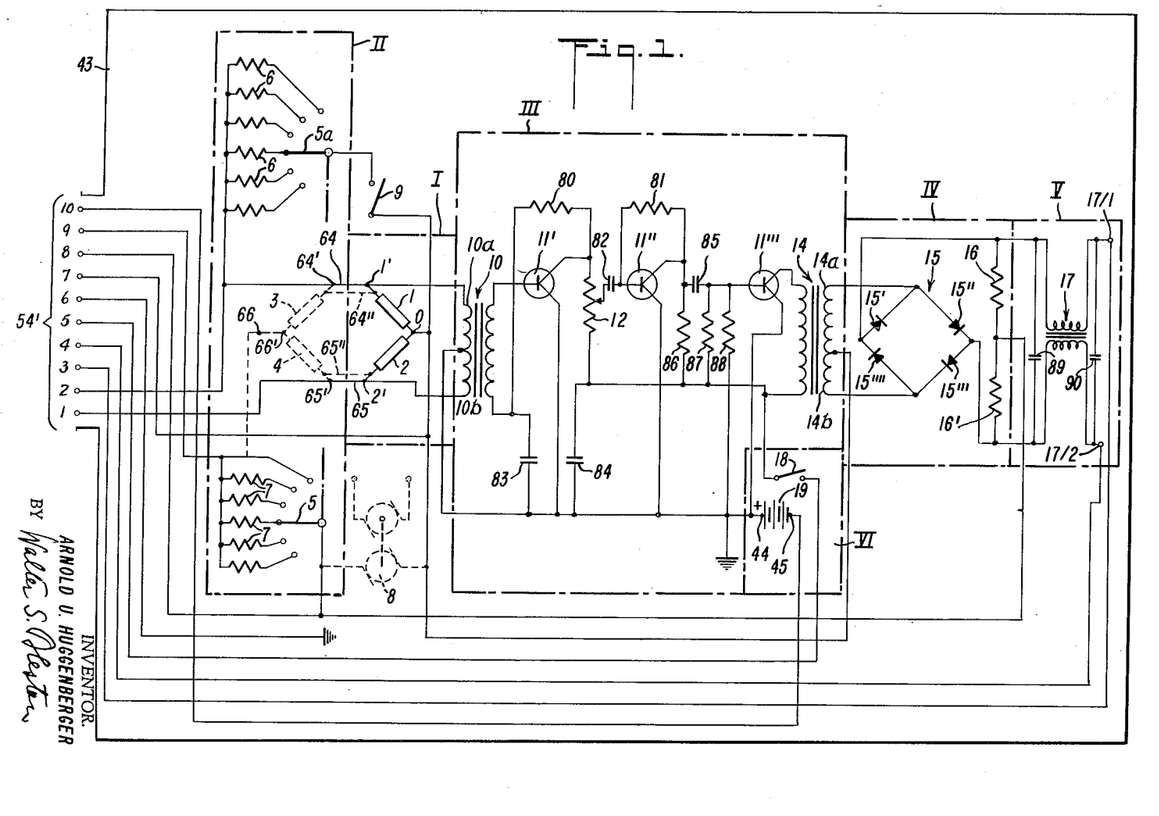
FIG. 1 is a circuit diagram of the amplifier with connecting plug for a testing device.

Referring now to the drawing, FIG. 1 shows the circuit diagram of an amplifier instrument with transistors. The dot-and-dash lines enclose assemblies located readily exchangeable in a common chassis. Assembly I contains a branch of the input Wheatstone bridge with two balancing resistances 1 and 2 which are located in the amplifier housing 43 separated from the measuring resistances 3 and 4 and which together with the resistances 3 and 4 constitute a complete bridge. The measuring resistances 3 and 4 are not located in the amplifier housing and for that reason are shown in dash lines. They are secured to an element which may be connected with the amplifier of FIG. 1 and subjected to stresses transmitted to the strain-gauge strips or measuring resistances as described hereinafter with reference to the measuring hub illustrated in FIGS. 9 and 10. The strips 3 and 4 are connected to each other at the point 66' and may be connected by leads 64" and 65", respectively, with the strips 1 and 2 to form an input Wheatstone bridge. These connections will be described later on more fully with reference to the mentioned FIGS. 9 and 10. When testing the amplifier and calibrating the push key values which will be described hereinafter, the measuring resistances 3 and 4 will be replaced by testing resistances 3' and 4' located in the testing apparatus shown in FIG. 7.

The assembly II comprises the measuring-range switch 5, 5a with the calibrating resistances 6 and the series resistances 7 for the input bridge. The contact arms of the switch parts 5 and 5a are mechanically connected for common movement. The calibrating resistances may be selectively connected in parallel to the strain-gauge strip 1 by means of a push key 9 and the measuring-range switch 5, 5a mounted on the amplifier chassis. Thereby the bridge can be unbalanced to an extent corresponding to a predetermined strain value. From the magnitude of the deflection caused by this calibrating resistance on an oscillograph illustrated in FIG. 10, the calibrating scale will be mechanically established. The calibrating method will be explained later on.

The assembly III comprises a three-stage linearly operating transistor measuring amplifier with the input transformer 10; the transistors 11', 11'', 11'''; the output transformer 14; the battery contacts 44, 45 (FIG. 5); the sensitivity regulator 12; base resistance 80 and 81; working resistance 86; voltage dividers 87, 88; coupling condensers 82, 85, and grounding condensers 83 and 84.

Assembly IV contains the output Wheatstone bridge with the ring modulator 15 which consists of four germanium diodes 15', 15'', 15''', 15'''' and the resistances 16 and 16' for symmetrizing the output bridge. The assembly V consists of a filter with the impedance coil 17 and condensers 89 and 90. The above mentioned oscillograph 109 of FIG. 10 may be connected to the terminals 17/1 and 17/2.

The current is supplied by a dry battery 19 which forms a separate assembly VI. The battery circuit can be closed by means of a switch 18 which may be united with the potentiometer 12, acting as a sensitivity regulator, into one device 12', as shown in FIG. 8.

FIG. 2 shows an ancillary device for measuring with inductive transmitters. This device may be substituted for the strain-gauge strips 3 and 4 of FIG. 1 and connected by means of three contact sockets 21, 22 and 23 to the amplifier at the points 66', 64' and 65' which are connected to the points 54'/9, 54'/2 and 54'/1, respectively, of the multiple plug 54' in FIG. 1.

A capacitative preliminary balancing of the input and output bridges will be obtained by the symmetrically arranged coils 10a, 10b and 14a, 14b of the input and output transformers, respectively.

Two inductive senders or transmitters 24 and 25, as shown in FIG. 2, may be secured to the members to be measured. The inductivity of these transmitters may be varied by varying the air gap or by shifting the core. The bridge may be capacitatively balanced with the aid of the condenser 13 and the potentiometer 26. The elements 24' and 25' are ohmic resistors serving the purpose of adapting the ohmic value of the transmitter branches 24, 24' and 25, 25' of the bridge to the ohmic value of the measuring strips which serve to balance the bridge.

FIG. 3 shows an output Wheatstone bridge as another ancillary instrument for measuring with inductive transmitters. A throw-over switch 27 serves for switching the ring modulator in the two positions "balancing" (left) and "measuring" (right). The right-hand position is shown in solid lines in FIG. 3. In the left-hand position of the switch 27, the two pairs of rectifiers (e.g. germanium diodes) 15', 15'' and 15''', 15'''' have their relative polarities inverted to form a Graetz or full-wave rectification circuit whereby any phase unbalance of the bridge may be made visible separately from any ohmic unbalance. When measuring (switch 27 in the solid-line position), an auxiliary voltage from the generator 8 of FIG. 1 will be applied to the coils 14a and 14b of the transformer 14 to serve as an undulated reference carrier. During the equalization of the phases (switch 27 shifted to the left-hand side into the dash-line position) the auxiliary voltage is cut off by contact 27'''. Slider 14c enables the selection of a desired no-load carrier-frequency amplitude.

Figures 4, 4A, 5, 6:
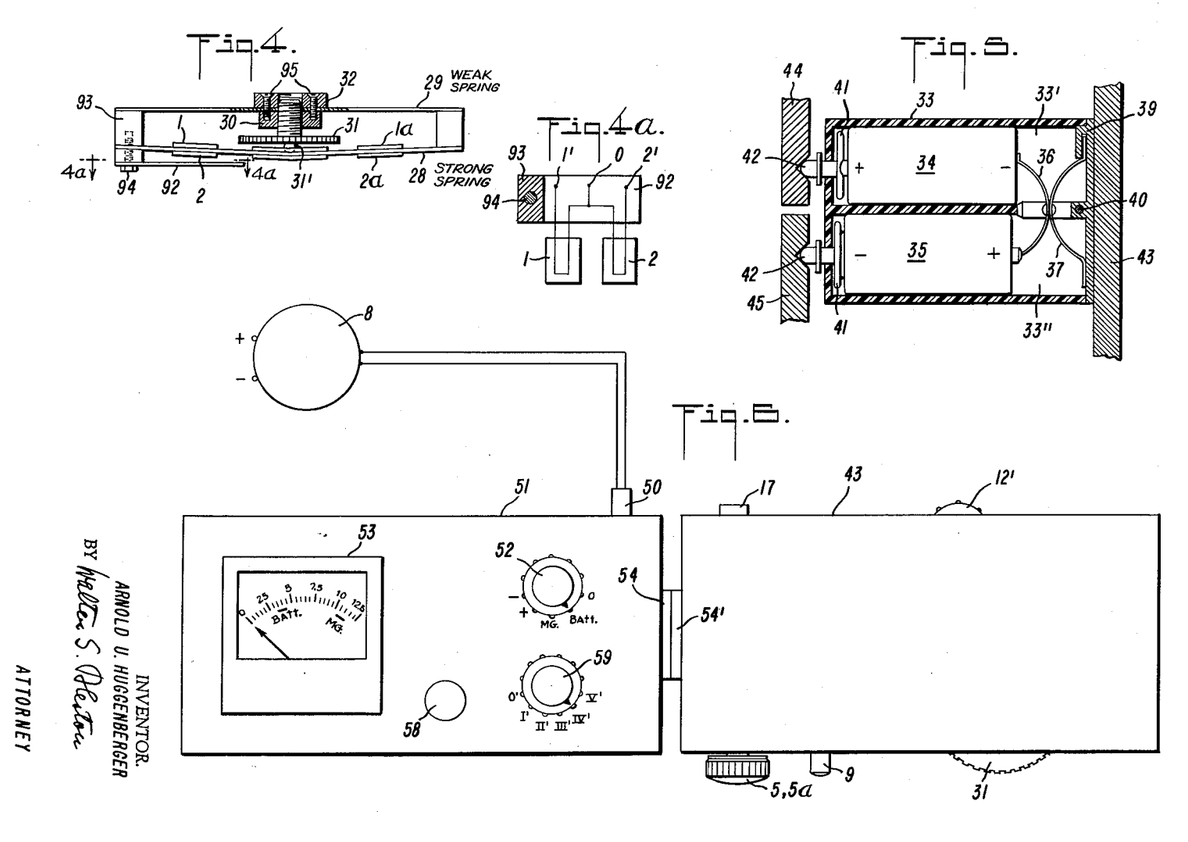
FIG. 4 is a resistor element for balancing the input bridge.
FIG. 4a shows diagrammatically a board for the electrical connection of the strips 1 and 2 in a section along line 4a—4a in FIG. 4.
FIG. 5 is a cross-section of a battery housing with springy contact bow.
FIG. 6 is a diagrammatical front elevation of the amplifier and testing apparatus with the connections of the motor-generator.
Figure 5:
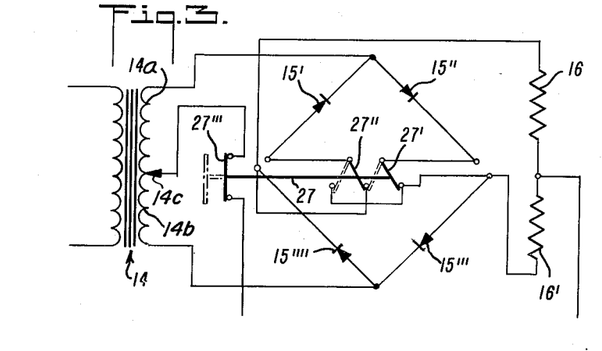
Figure 6:
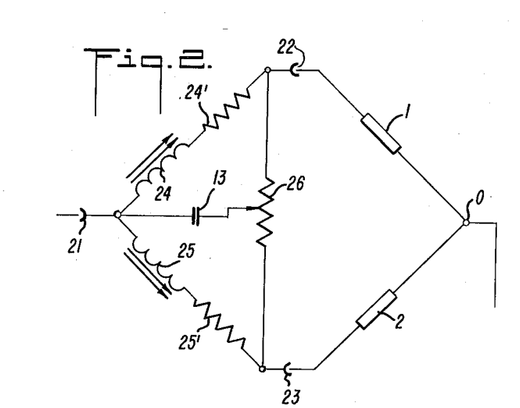

FIG. 4 illustrates a resistance element for balancing the input Wheatstone bridge 1, 2, 3, 4 in FIG. 1. The resistance strips 1 and 2 are secured to the upper and lower sides, respectively, of a steel spring 28 connected at its ends to another steel spring 29. An adjustment screw 31 is screwed into a nut 30 secured to the chassis 32 of the instrument by means of screws 95. Screw 31 abuts with a ball 31' against the steel spring 28. The spring 29 is secured to the nut 30 by any suitable means not shown.

Upon turning of the screw 31 the tension of the springs 28 and 29 can be increased or decreased depending on the direction in which the screw is turned. In both cases the resistance values of the measuring strips will be changed in the opposite sense. This results in changes of the bridge elements of the bridge half 1, 2 by inverse but equal amounts.

Another pair of strips 1a, 2a may be secured to the spring 28 but may have different resistance values from the strips 1, 2. The strips 1a, 2a may be used instead of the strips 1, 2 for another measuring range.

A switch board 92, also shown in FIG. 4a, is secured by a screw 94 to the spacer 93 located between the springs 28 and 29 at one of their ends. The switch board is provided with output contacts, such as soldering points 1', 0 and 2' schematically indicated in the drawing. 1 and 2 are the diagrammatically illustrated resistance transmitters or strain-gauge strips which are cemented to both sides of the leaf spring 28 respectively, and connected to the contacts 1', 0, 2', in the illustrated manner.

In a special embodiment, the springs are made of different strengths; especially spring 29 may be weaker than spring 28. Thereby it is possible to deform spring 28 less upon an equal turn of the screw 31, which corresponds to an increased fineness of the balancing of the bridge. Thereby, the construction becomes independent of the fineness of the pitch of the thread of screw 31. Thus, the described resistance elements render a contactless and stepless fine balancing of the input bridge possible.

FIG. 5 illustrates the arrangement of the battery 19 as of FIG. 1 in a plastic and glass housing 33. The two dry cells 34 and 35 are installed in inversed positions in the chambers 33' and 33'' and conductively connected to each other by the springy contact bow 36. The bow 36 is connected with another bow 37 which is inserted into a pocket of the cover 39. The cover 39 may be fastened in the housing 33 by means of a pin 40. The cells 34 and 35 abut against contact plates 41 each of which is secured with a pin 42. The pins project outwardly through bores of the housing 33. Thus, housing 33 with cells 34, 35 may be resiliently installed between the wall 43 of the amplifier housing and the two contact plates 44 and 45 of assembly III.

The voltage of the battery can be altered by changing the cells in the housing 33. Thereby it is possible to change in a simple manner the transistor-amplifier output with a given input voltage fed into the transformer 10 to change the sensitivity of the entire device.

FIG. 6 is a diagrammatical front elevation of the amplifier and testing instrument. The motor-generator aggregate 8 for the generation of the carrier-frequency voltage is connected via a bipolar socket 50 at housing 51 in the current circuit of the testing instrument. A switch 52, more clearly shown in the circuit diagram (FIG. 7) of the testing instrument, serves for checking the functioning of the amplifier. The switch has the positions "0," battery "Batt.," motor generator "MG." "+" and "—" and is connected to the milliammeter 53. The several contact points of the switch are connected with the exit sleeves of a multiple socket 54. A step switch 59 serves for testing the linearity of the amplifier. 58 is a loading plate (see FIG. 7) secured to a bending spring 57 clamped to the testing instrument and provided with resistance strips. The plate 58 is designed to receive thereon calibrated weights.

The multiple plug 54' of the amplifier can be plugged into the multiple socket 54 of the testing apparatus in order to connect the one instrument to the other. The switch and sensitivity-regulator unit 12' is arranged at the amplifier housing 43 and will be described hereinafter with reference to FIG. 8. The measuring-range switch 5a, with which the voltage divider 5 is mechanically coupled, serves for connecting graduated resistances in parallel to the resistance strips of the input bridge. Simultaneously with switch 5a the voltage divider 5 will be adjusted which, by connecting resistances 7 in the circuit, changes the carrier-frequency voltage at the terminals 0, 66' in dependence on the switched-on resistance 6. In consequence thereof an oscillograph deflection of substantially constant magnitude can be obtained in such a manner that a high carrier-frequency voltage corresponds to a high resistance 6 and a low carrier voltage corresponds to a low resistance. The parallel circuit 0, 9, 5a, 6, 1' can be closed by pressing the push key 9 in order to plot the scale of the forces or to read the ammeter. The input bridge can be balanced by turning the adjustment disc 31.

In the circuit diagram (FIG. 7) of the testing instrument the input socket 50 for the carrier-frequency voltage is shown and the housing of the testing instrument is denoted by 51. The switch 52 for the testing of performance has the arms 52' and 52". The ammeter is designated by 53. The ends of the several leads from the switch points are connected to sleeves of the multiple socket 54. A rectifier 55 is connected in series with the aforementioned contact points MG. of the switch. The contact points "Batt." are connected to the sleeves 54/5 and 54/6 of the socket 54, a resistance 56 being intercalated between the upper "Batt." point and the sleeve 54/5.

Figure 7:
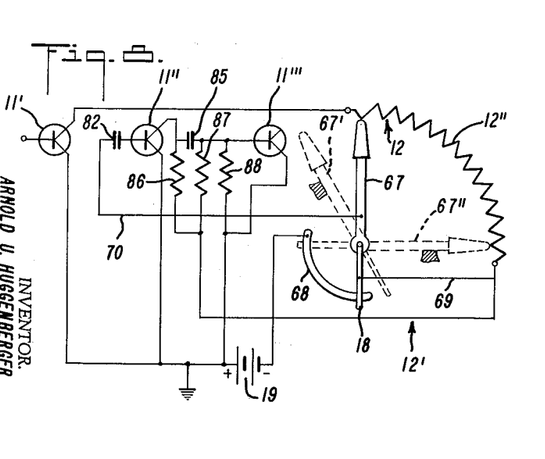
FIG. 7 is a diagram of a testing apparatus showing connections and switching elements.

The aforementioned bending spring 57 which is clamped to the housing carries two resistance strips 3' and 4', the resistance values of which can be varied by bending strip 57 by means of weights placed on the plate 58. The common end point of the strips 3' and 4' is connected to the socket sleeve 54/9 whereas the free ends of the strips are connected to the socket sleeves 54/1 and 54/2 respectively.

A graduated or step switch 59 serves for testing the linearity of the amplification. This switch comprises a contact arm 59' with two contact segments 60 and 61, the series resistances 62/1 to 62/5, the bank contacts I' to V' and I" to V" and the two zero contacts 0' and 0". The segments 60 and 61 are connected with the free ends, respectively, of the gauging strips 3' and 4'. The series resistances 62/1 to 62/5 are connected by one of their ends with the jointed ends of the gauging strips 3' and 4'. The other ends of the series resistances are connected with the contacts I" to V", respectively. The contacts I' to V' are respectively connected to the contacts I" to V".

The series resistances are so dimensioned that they will cause an unbalancing of the input bridge of the amplifier in equal steps. The closing of the contacts with two separate segments 60 and 61 renders it possible to test both branches of the input bridge separately as to symmetry.

The aforementioned combined device 12' comprising the battery switch 18 and the potentiometer 12 is diagrammatically shown in FIG. 8. The contact arm 67 of conductive material, being part of the potentiometer, is connected with the contact arm 18 for common rotation. The two arms 67 and 18 are insulated from each other. The arm 67 is adapted to slide on the potentiometer wire 12", while the arm 18 slides on the contact segment 68. In the solid-line position of the arms 67 and 18, the entire resistance of wire 12" is connected between the minus terminal of the battery 19 (via segment 68, arm 18 and lead 69) and the transistor 11" (via arm 67, lead 70 and condenser 82). The left-hand dash-line end position 67' of the arm is the switched-off position in which the contacts 18, 68 are open and, consequently, the potentiometer wire 12" is without current. In the right-hand, dash-line end position 67" of the arms 67 and 18, the transistor 11" is directly connected with the minus terminal of the battery 19 through lead 70, arm 67, lead 69, arm 18 and segment 68. Thus, the potentiometer resistance is short-circuited.

In order to test the operation of the amplifier, the latter and the testing instrument will be connected by the socket and plug 54, 54' and the plug of the motor-generator aggregate 8 will be connected to the socket 50. The individual plugs 54'/1 to 54'/10 are so connected to the parts of the amplifier to be tested that the testing gauging strips 3' and 4' together with the balancing gauging strips 1 and 2 form the input bridge and are in the place of the gauging strips 3 and 4, shown in dash lines in FIG. 1, which are to be used in the subsequent measuring. The carrier-frequency voltage will be fed to the testing instrument at 50 (FIGS. 6 and 7) and admitted, on the one hand, via the rectifier 55 to the contact points or terminals MG. of the switch 52 and, on the other hand, via the plug connections 54/7, 54'/7 and 54/8, 54'/8 and the voltage divider 5 (FIG. 1) to both the input-bridge elements 1, 2 and the output bridge 15.

One of the terminals of the battery 19 is grounded, the other one being preferably connected to the plug 54'/10 (as illustrated in FIG. 1) instead of leading directly to the contact 68 of the switch 18 as shown in FIG. 8. The latter contact is then connected to the plug 54'/5, as indicated for the corresponding switch contact in FIG. 1. The socket 54 of the testing instrument or the plugging means of the measuring cable 111 in FIG. 10b contains a bridging connection 63 which connects the battery 19 with the switch 18 when the parts 54, 54' are plugged together. By actuating the combined switch and sensitivity regulator 12' the battery will be switched on. When disconnecting the plug, the battery will be switched off automatically.

The output terminals 17/1 and 17/2 of the amplifier are connected via the plug 54'/3 to the upper "+" contact point and the lower "—" contact point and via plug 54'/4 to the upper "—" contact point and the lower "+" contact point of the switch 52. It will be noticed that the two contact arms 52' and 52" of the switch 52 are displaced with respect to each other through 180 degrees and turnable in the same direction. If the contact arms engage both "+" points, the terminal 53' of the measuring device 53, i.e. the milliammeter, is connected to the socket 54/4 of the amplifier output via the arm 52'. Simultaneously, the terminal 53" is connected with the socket 54/3 of the amplifier via the contact arm 52". When, however, the contact arms engage the "—" contact points, the measuring instrument is connected to the amplifier output with reversed polarity since, in that event, the terminals 53' and 53" are now connected with the sockets 54/3 and 54/4 respectively.

The testing of the operation of the amplifier takes place in the following manner: The testing instrument and the amplifier will be plugged together and the motor-generator 8 will be connected at 50. Thereupon, the amplifier will be switched on by actuating the combined unit 12' so that the arm 18 contacts the segment 68, as shown in FIG. 8. The battery voltage and the generator voltage will be checked with switch 52 in the positions "Batt." and "MG." The indicating ranges for the admissible values in milliamperes are marked on the scale of the instrument 53.

Subsequently, switch 52 will be turned into the "—" or the "+" position whereby the indicating instrument will be connected to the amplifier output. The "—" or the "+" position will be selected according to the polarity at the amplifier output side. The measuring-range switch 5, 5a functions as follows: While a certain resistance 6 is switched on by depressing the key 9, the bridge 1, 2, 3′, 4′ (precedingly balanced to zero) will be unbalanced in that, between the points 1′ and 2′, a potential difference will be created which will vary inversely with the magnitude of the resistance 6.

Now, with key 9 open, the input bridge will be balanced by turning the adjustment screw 31, shown in FIG. 4, until the ammeter 53 indicates zero. Thereupon switch 5, 5a will be turned to the first position. The regulator arm 67 will also be turned to the position of lowest sensitivity. The amplifier has the greatest sensitivity when condenser 82 receives the full battery voltage. This is the case when the contact arm 67 is in its horizontal position in FIG. 8 as will be explained hereinafter.

Thereafter, the step switch 59 will be turned to the step III′ or IV′ and after the push key 9 has been depressed the regulator arm 67 will be adjusted until the ammeter shows a predetermined deflection, e.g. 10 milliamperes. If this is done the deflections in the other positions of the switch 59 must render linearly increasing values. Thus, a linear amplifier characteristic will be insured.

The step switch 59 connects at each step a predetermined resistance value parallel to one of the strain-gauge strips 3′ or 4′. The resistances are so dimensioned that they correspond to uniform load increments in per-mill elongation, e.g. so that one step corresponds to .1 per-mill elongation. The indications of the indicating instrument will then correspond to .1, .2, .3, .4, .5 per mill. With this adjustment the scale values at the other steps of the voltage divider 5, 5a can be found. These scale values amount to corresponding multiples of the value .1 per mill. With the aid of the step switch 59 in the testing instrument, the unbalance signals, i.e. the deflections of the oscillograph when key 9 is depressed, will be ascertained for the several measuring-range steps of the amplifier corresponding to the several positions of switch 5, 5a.

Thus the resistances 6 will be calibrated in per-mill elongations, kilograms, meterkilograms, etc., so that the elongation or stress scale of the amplifier may be determined by means of the unbalance signal in millimeters of the oscillograph deflection. The calibrations of the unbalance signal will be carried through at different settings of the amplifier which are adjusted with the aid of the sensitivity regulator 12.

By placing calibrated weights on the plate 58, the calibration in per-mill elongation can be carried through by a mechanical unbalancing of the input bridge owing to a loading of the spring 57. Thereby, a checking of the electrical comparison load by means of the series resistances 62/1 to 62/5 is rendered possible with the aid of the applied weights. For instance, each weight may be calibrated in a manner corresponding to .05 per-mill elongation. Upon the application of 1 to 5 individual weights, one after the other, the indicating instrument must indicate uniformly increasing deflections.

In order to describe the operation of the instrument when taking measurements, it is assumed that e.g. the torque in the propeller shaft of a motor vehicle is to be measured. For this purpose, a measuring hub of the kind shown in FIG. 9 may be used. This hub consists of two sections. The first or male section consists of the flange 100 and the cylindrical portion 101. The second or female section consists of the flange 102 and the cylindrical sleeve 103. The cylinder portion 101 extends through the female section so that the flanges 100 and 102 are at opposite ends of the hub. At the end where the flange 102 is located, the two sections are connected by keys 104 for joint rotation. The gauging strips 3 and 4, also visible in FIG. 1, are connected to the cylinder 101 in a cross-wise arrangement. The ends 3′ and 4′ are connected to each other at 66′ and to the slip ring 112 by a wire 66 which is passed through a bore 117 of the sleeve 103. The other two ends 64′ and 65′ are connected to the slip rings 113 and 114, respectively, by wires 64″ and 65″ passed through bores 115 and 116, respectively, of the sleeve 103.

Figures 10, 10A, 10B, 11:
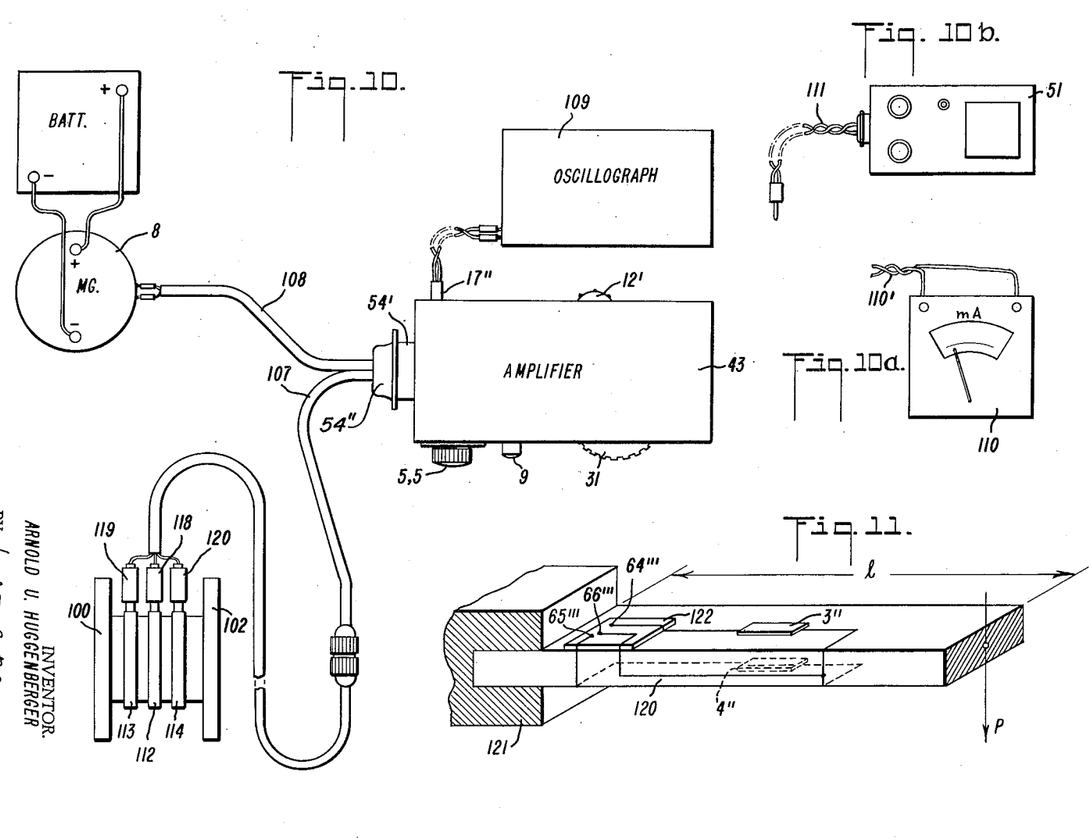
FIG. 10 is a diagrammatical illustration of a measuring system according to the invention for measuring torques.
FIG. 10a illustrates a milliammeter which may be substituted for the oscillograph shown in FIG. 10.
FIG. 10b shows diagrammatically the testing apparatus of FIG. 7 which may be used for the zero balancing of the input bridge if no milliammeter is available.
FIG. 11 is a perspective diagram illustrating another form of application of measuring transmitters.

For measuring purposes, the measuring hub will be fastened with the flanges 100 and 102 to the structural element to be measured, e.g. to the propeller shaft of a motor vehicle, by means of screws so that the torque to be transmitted through the propeller shaft causes in the measuring hub a torsion of the cylinder 101 which will be measured by means of the strips 3 and 4. If the torque acts in a direction to lengthen the pair of strips 3 while shortening the other two strips 4, as indicated by the arrows Md, the electrical resistance in strips 3 will be increased whereas that in strips 4 will be lowered. The corresponding currents in the strips can be conducted to the amplifier 43 through collecting brushes 118, 119, 120 which slide on the slip rings, as shown in FIG. 10, and through the cable 107.

Figure 9:
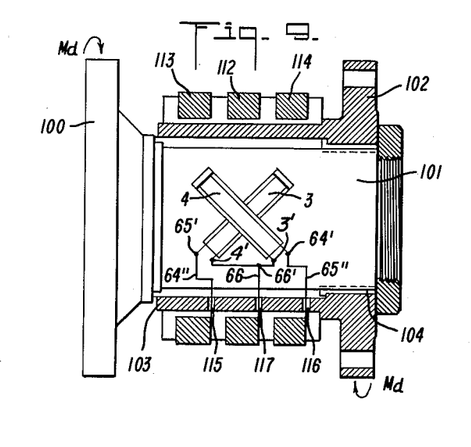
FIG. 9 shows a measuring hub as an example of the mounting of a resistance transmitter.

When taking the measurements, the part to be measured, i.e. in the illustrated embodiment the hub of FIG. 9, will be connected to the amplifier system of FIG. 1 in lieu of the testing apparatus of FIGS. 6 and 7. For this purpose, first the multiple plug and socket 54, 54′ will be disconnected and thus the testing apparatus will be separated from the amplifier. The plug contact 50 will be disengaged and the motor-generator aggregate 8 will be connected by means of cable 108 to plug 54′, as shown in FIG. 10, with the aid of a multiple socket 54″ generally similar to the socket 54 of FIG. 7. The hub 100, 101 to be measured will also be connected by means of cable 107 to the plug 54′. The oscillograph 109 will be connected to the socket 17″ containing the terminals 17/1 and 17/2, shown in FIG. 1.

In order to calibrate the elongation or stress scale, a certain resistance value 6 is chosen by setting switch 5, 5a. While the key 9 is depressed, the sensitivity potentiometer 12 will be so adjusted that the unbalance signal covers as far as possible the entire available width of the paper strip of the oscillograph. With this so adjusted unbalance signal the scale of stress will be determined. If, then, b is the mentioned entire available paper width in millimeters corresponding to x meterkilograms wherein x is the calibration value of the resistance 6, then 1 millimeter width of the paper corresponds to x/b meterkilograms. Thereby the amplifier is adjusted to the measuring range of x meterkilograms, that means, torques at the object of measurement can now be found up to a rate of x meterkilograms.

If a smaller resistance 6 will be connected in parallel to the Wheatstone bridge arm 1, a larger deflection of the oscillograph will be obtained, that means, the deflection will pass beyond the width of the paper strip. For this reason, the sensitivity of the amplifier must be lowered by means of the potentiometer 12 until the oscillograph deflection is within the width of the paper. The new scale of forces is then $$1 \text{ millimeter} = \frac{x_1}{b_1} \text{ meterkilograms}$$

and the new measuring range is $x_1$ meterkilograms.

Simultaneously with the resistance 6 the carrier-frequency voltage will be so adjusted with switch 5 that this voltage (connected across the bridge at the points 0 and 66′) is small when the unbalancing is large, which will be caused by large changes of the resistance in the measuring strips 3 and 4, and that it is high when the unbalancing is small.

The changes of the resistances in the strips 3 and 4 are a measure for the elongation of the cylinder 101 and the strain of the structural element to be measured. The changes of the resistance cause a disturbance of the balance of the Wheatstone bridge 1, 2, 3, 4 which prior to the measuring was balanced to zero. In its balanced position, no current flows through the bridge coil 10a, 10b of the input transformer 10. Owing to the resistance changes just described, currents will flow through the coil 10a, 10b and, after magnification in the amplifier 43, will be plotted in the oscillograph 109.

In order to prevent overloading of the oscillograph when the measuring operation is started, the zero balancing by turning the adjustment screw 31 may be carried through with the aid of an ammeter 110 which will be connected at 17" instead of the oscillograph 109. The oscillograph will then be connected instead of the ammeter when the zero balancing has been completed.

If no other ammeter is available, the zero balancing may be carried through with the ammeter of the testing apparatus. For this purpose, a twin cable 111, shown in FIG. 10b and provided with two end contacts at each end, may be plugged into the sockets 54/3 and 54/4 of the testing instrument and into socket 17" of the amplifier.

The zero balancing having been finished, the oscillograph 109, instead of the testing instrument, will be connected to the amplifier housing 43. Then the unbalance signal can be found in the manner described hereabove.

In the foregoing, the functioning of the device according to the invention has been described in application to a measuring hub. However, there are many other fields of application where the device can be used to great advantage. Only one other example of such application will be described with reference to FIG. 11. In this figure measuring transmitters 3" and 4" are shown which correspond to the measuring transmitters 3 and 4 of the input bridge of FIG. 1. The measuring transmitter 3" is secured to the tension side of a test body 120 which is clamped at 121 and subjected to a bending moment $P \times l$ wherein P is the force and $l$ is the length of the lever arm. The measuring transmitter 4" is secured to the compression side of the body 120. The measuring transmitters are connected by a lead 123 to each other and to a soldered terminal 66''' on the connecting board 122. The free ends of the two transmitters are connected to soldered terminals 64''' and 65''' respectively. The three soldered terminals will be connected by leads not shown to the connecting points 1', 2' and 66' of the amplifier 43 in FIG. 1. In all other respects the application of the invention to the test body 120 corresponds to the application of the device to the measuring hub described hereinbefore.

It will be apparent to those skilled in the art that many alterations and modifications of the method and structure hereinbefore described are possible without departure from the essence and spirit of the invention which for that reason shall not be limited but by the scope of the appended claims.

I claim:

1. In an apparatus for the measurement of displacements, stresses and strains on an object, in combination, a measuring unit and a testing unit for said measuring unit, said units being respectively provided with first and second multiple connector means complementary to each other, said units being detachably coupled together by the interengagement of said first and second connector means; said measuring unit including amplifier means, a pair of first impedance elements connected to the input of said amplifier means, said elements forming two impedance arms of a bridge circuit adapted to be completed by means of two strain-gauge elements connected with the object of measurement, modulating means connected to the output of said amplifier means, circuit means for connecting a source of carrier oscillations across said bridge circuit and to said modulating means, calibrating impedance means, and first switch means for selectively connecting different parts of said calibrating impedance means in one of said arms of said bridge circuit along with one of said first impedance elements thereof; said testing unit including a pair of second impedance elements connected via said second and first connector means to said first impedance elements as the other two arms of said bridge circuit, testing impedance means, second switch means for selectively connecting different parts of said testing impedance means in one of said other arms of said bridge circuit along with one of said second impedance elements thereof, and indicator means connected via said second and first connector means to the output of said modulating means for indicating the electric output energy of the latter in different positions of said first and second switch means.

2. The combination according to claim 1 wherein said amplifier means comprises a transistor network.

3. The combination according to claim 1 wherein said second impedance elements comprise adjustable reactances.

4. The combination according to claim 1 wherein said second impedance elements comprise two strain-gauge strips, said testing unit further including a deformable support for said strips.

5. The combination according to claim 4 wherein said support comprises an arm provided with a holder for calibrated weights, said strips being attached to opposite sides of said arm.

6. The combination according to claim 1 wherein said first impedance elements comprise two strain-gauge strips, said measuring unit further including a deformable support for said strips.

7. The combination according to claim 6 wherein said support comprises a first leaf spring of relatively high flexibility, a second leaf spring of relatively low flexibility secured at its ends to said first leaf spring, and adjustable spacer means positioned between said springs intermediate said ends for deforming said springs, said strips being attached to said opposite surfaces of said second leaf spring between said spacer means and one of said ends.

8. The combination according to claim 1 wherein said second switch means is provided with two sets of contacts for respectively connecting said testing impedance means across either of said second impedance elements.

9. The combination according to claim 1 wherein said modulating means comprises four rectifying branches interconnected as a ring modulator, an input transformer having a secondary winding connected across a diagonal of said ring modulator, and filter means connected across the other diagonal of said ring modulator, said indicator means being connected across said filter means, said circuit means including a connection to an intermediate tap on said secondary winding.

10. The combination according to claim 9 wherein said modulating means is provided with switch-over means for converting said ring modulator into a full-wave rectifier bridge by reversing the connections between certain of said branches, said switch-over means being simultaneously operable to disconnect said circuit means from said tap.

11. The combination according to claim 1 wherein said circuit means terminates at said first connector means, said testing unit being provided with an extension for said circuit means leading from said second connector means to said source of carrier oscillations.

12. The combination according to claim 1 wherein said amplifier means is provided with an energizing circuit including a source of current in said measuring unit, a pair of conductors extending from a terminal of said source and from an electrode of said amplifier means to respective terminals of said first connector means, and bridging means at said testing unit connected across corresponding terminals of said second connector means.

13. In an apparatus for the measurement of displacements, stresses and strains of an object, in combination, amplifier means, a pair of first impedance elements connected to the input of said amplifier means, said elements forming two impedance arms of a bridge circuit, modulating means connected to the output of said amplifier means, circuit means for connecting a source of carrier oscillations across said bridge circuit and to said modulating means, calibrating impedance means, first switch means for selectively connecting different parts of said calibrating impedance means in one of said arms of said bridge circuit along with one of said first impedance elements thereof, a pair of second impedance elements connected to said first impedance elements as the other two arms of said bridge circuit, testing impedance means, second switch means for selectively connecting different parts of said testing impedance means in one of said other arms of said bridge circuit along with one of said second impedance elements thereof, and indicator means connected to the output of said modulating means for indicating the electric output energy of the latter in different positions of said first and second switch means; said modulating means comprising four rectifying branches interconnected as a ring modulator, an input transformer having a secondary winding connected across a diagonal of said ring modulator, and filter means connected across the other diagonal of said ring modulator, said indicator means being connected across said filter means, said circuit means including a connection to an intermediate tap on said secondary winding, and switch-over means for converting said ring modulator into a full-wave rectifier bridge by reversing the connections between certain of said branches, said switch-over means being simultaneously operable to disconnect said circuit means from said tap; said second impedance elements being replaceable by respective strain-gauge elements connected with the object of measurement.

14. In an apparatus for the measurement of displacements, stresses and strains of an object, in combination, amplifier means, a pair of first impedance elements connected to the input of said amplifier means, said elements forming two impedance arms of a bridge circuit, modulating means connected to the output of said amplifier means, circuit means for connecting a source of carrier oscillations across said bridge circuit and to said modulating means, calibrating impedance means, first switch means for selectively connecting different parts of said calibrating impedance means in said bridge circuit in parallel with one of said first impedance elements, a pair of second impedance elements connected to said first impedance elements as the other two arms of said bridge circuit, testing impedance means, second switch means for selectively connecting different parts of said testing impedance means in said bridge circuit in parallel with one of said second impedance elements, and indicator means connected to the output of said modulating means for indicating the electric output energy of the latter in different positions of said first and second switch means; said second impedance elements comprising two strain-gauge strips provided with a common deformable supporting arm terminating in a holder for calibrated weights matching said different parts of said testing impedance means whereby the latter may be checked for accuracy, said strips being attached to opposite sides of said arm for relatively inverse deformation in response to a loading of said arm by said weights; said second impedance elements being replaceable by respective strain-gauge elements connected with the object of measurement.

15. In an apparatus for the measurement of displacements, stresses and strains of an object, in combination, amplifier means, a pair of first impedance elements connected to the input of said amplifier means, said elements forming two impedance arms of a bridge circuit, modulating means connected to the output of said amplifier means, circuit means for connecting a source of carrier oscillations across said bridge circuit and to said modulating means, calibrating impedance means, first switch means for selectively connecting different parts of said calibrating impedance means in said bridge circuit in parallel with one of said impedance elements, a pair of second impedance elements connected to said first impedance elements as the other two arms of said bridge circuit, testing impedance means, second switch means for selectively connecting different parts of said testing impedance means in said bridge circuit in parallel with one of said second impedance elements, and indicator means connected to the output of said modulating means for indicating the electric output energy of the latter in different positions of said first and second switch means; said first impedance elements comprising a pair of strain-gauge strips provided with a common support, said support including a first leaf spring of relatively high flexibility, a second leaf spring of relatively low flexibility secured at its ends to said first leaf spring, and adjustable spacer means positioned between said springs intermediate said ends for deforming said springs, said pair of strips being secured to opposite surfaces of said second leaf spring between said spacer means and one of said ends; said second impedance elements being replaceable by respective strain-gauge elements connected with the object of measurement.

References Cited in the file of this patent

UNITED STATES PATENTS

| | | |
|---|---|---|
| 1,858,026 | Schulte et al. | May 20, 1932 |
| 2,547,926 | Cook | Apr. 10, 1951 |
| 2,598,812 | Marco et al. | June 3, 1952 |
| 2,870,630 | Siversten | Jan. 27, 1959 |

FOREIGN PATENTS

| | | |
|---|---|---|
| 782,092 | Great Britain | Sept. 4, 1957 |